T. B. BURTIS.
Gas Purifier.
No. 64,194. Patented Apr. 30, 1867.
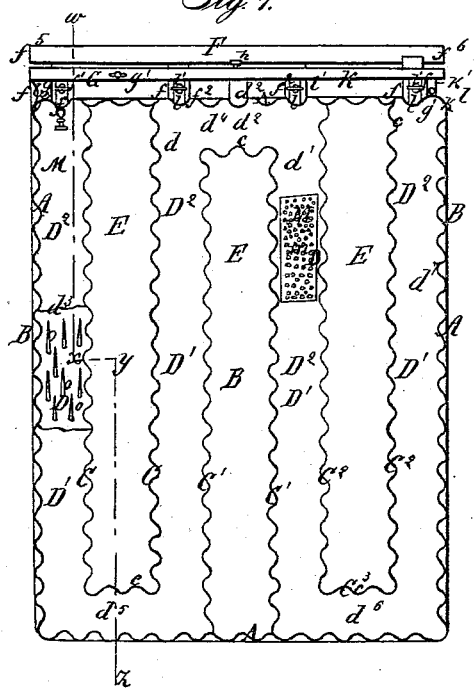
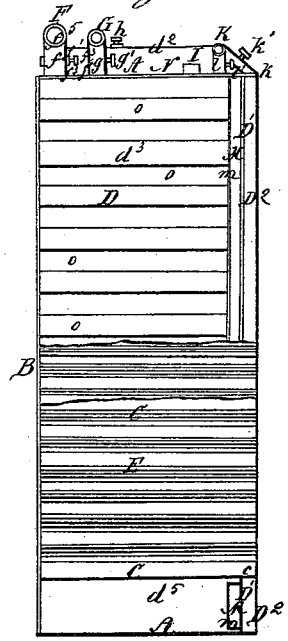
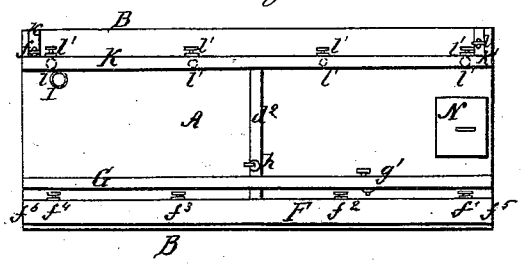
Witnesses:
Inventor:

United States Patent Office.

THOMAS B. BURTIS, OF CHICAGO, ILLINOIS.

Letters Patent No. 64,194, dated April 30, 1867.

---

IMPROVED GAS CONDENSER, SCRUBBER, AND WASHER.

---

The Schedule referred to in these Letters Patent and making part of the same.

---

TO ALL WHOM IT MAY CONCERN:

Be it known that I, THOMAS B. BURTIS, of Chicago, in the county of Cook, in the State of Illinois, have invented a new and useful Improvement in Gas Condenser, Scrubber, and Washer; and I do hereby declare that the following is a full and exact description thereof, reference being had to the accompanying drawings, and to the letters of reference thereon.

The application of my said invention is more especially for cleansing and purifying the illuminating gas made by dry distillation of bituminous coal, but the application thereof may be advantageously made when gases, volatile oils, or liquids are to be deprived of aqueous impurities, ammoniacal and carbonic acid gases. The nature of my invention is in the arrangement of a series of lengthy but narrow boxes, standing uprightly, through which the material to be cleansed (be the same gas or liquid) is passed, and into which the washing fluids (usually water) are introduced in jets, said boxes being so placed that their greater surfaces are cooled by water which slowly circulates in intermediate spaces between said boxes. My said invention is furthermore in certain detail arrangements, which will hereinafter more fully and clearly appear.

To enable those skilled in these arts to fully make and use my said improvements I will now proceed to describe the construction and operation thereof, referring to the accompanying drawings, of which—

Figure 1 is a general plan, showing the arrangement of gas boxes and water spaces.

Figure 2 is an end elevation, showing the connecting pipes.

Figure 3 is a vertical section along the line $w\,x\,y\,z$ of the plan.

The parts composing my said condenser, scrubber, and washer will be usually made of cast and wrought iron, excepting certain valves and stop-cocks, which are brass; the joints being made gas-tight in the usual manner. I construct the exterior casing or siding A of corrugated iron, securing the same tightly to the bottom B. By a series of inner corrugated walls $C\,C^1\,C^2$ the space enclosed by A is subdivided into the gas boxes D, covered by the tops D' and the water spaces E. The peculiar arrangement of the partition sides $C\,C^1\,C^2$ is apparent from the plan as shown in fig. 1, the arrangement being such that the gas or other stuff to be acted on shall, in passing the boxes D, traverse the greatest possible distance. Moreover, the arrangement of the sides of A and $C\,C^1\,C^2$ is intended to furnish a largely increased surface to the condensing and cooling action of air and water by the corrugated surfaces of said parts. In order that the condensing and cooling action of water may be increased I have arranged the sides $A\,C\,C^1\,C^2$ to project above the tops of the boxes D, thus forming a series of shallow vessels $D^2$ above said boxes. I then make a number of holes, $c$, in the upper edges of $C\,C^1\,C^2$ which permit the water to pass from the water spaces E on to and in to said vessels $D^2$. In order to pass the gas (or other material for purification) into the boxes D, I construct the pipes F and G, connecting the same by means of shorter pipes $f$ and $g$ with the end surfaces of D. To regulate or shut off the passage of gas into each box D, said connecting pipes $f$ and G are arranged with the usual proper stop-cocks or valves $f^1\,f^2\,f^3\,f^4$ and $g'$. The contiguous central gas boxes $d$ and $d^1$ may be seperated by a partition, $d^2$. In said partition a valve, $h$, may be placed, through which gas may be passed, thereby connecting said boxes $d$ and $d^1$. The gas (in the arrangement as drawn) is supposed to enter the pipes F at $f^5$, to pass through the pipe $f$ and valve $f^1$, into the first box $d^3$, and along the interior hereof to its opposite end, where it connects by the connecting-chamber $d^5$ with the next box $d$. The gas then passing along this to its end, where in the connecting-chamber $d^4$ is the partition $d^2$, through the valve $h$, herein and through the box $d^1$ to the opposite end, and through the connecting-chamber $d^6$ up the box $d^7$, and out of this through the exit pipe I, it being then supposed that the valves $f^2\,f^3$ and $f^4$ in $f$ are closed. In case, for instance, the boxes $d^1$ and $d^7$ are to be cleansed they may be shut, and the valve $h$ being closed the gas will pass through $d^3\,d^5$ and $d$, and passing in the connecting pipe to F the valve $f^2$ will pass finally out of F at $f^6$, and thus similarly, by properly manipulating the stop-cocks before mentioned, any of said series formed by two contiguous boxes joined by the chambers $d^5$ and $d^6$ may be cleansed, the use thereof as purifiers and condensers being temporarily stopped, whilst the remaining series of boxes is fully useful to the purposes of this invention. It is well known that, for example, illuminating gas, after it has passed the retorts in which it is evolved, and after it has passed the proper conducting mains, or pipes, is still highly heated and charged with aqueous vapors, ammoniacal gas, carbonic acid gas, and other impurities. To deprive the illuminating gas of these impurities it is usual to cool the gas, and thereby condense the aqueous vapors to water, and then also to wash or scrub the gas by passing jets of water through the same, and thereby extract the ammoniacal gases which are absorbed in water, and also, to some extent, extract the carbonic acid and sulphuretted hydrogen gases which also are absorbed in the water. As has been explained, the corrugated surfaces A C $C^1$ $C^2$ $C^3$, &c., are specially arranged to conduct off the heat, and they, therefore, act to cool or condense the gas in the boxes D; moreover, the water in the water spaces E acts efficiently to cool said corrugated surfaces, and acts thus upon the gas within; lastly, the arrangement of the shallow vessels $D^2$, whereby water is held on the tops of the boxes D, acts efficiently for the same purposes. It is in this, therefore, that my said improved invention acts efficiently as a condenser.

The arrangement of my said improvement as a scrubber and washer is in the manner now here following: From the shallow vessels $D^2$ I construct overflow pipes $k$, connecting with the water pipe K; in said pipes $k$ the valves or cocks $k'$ may be placed to control this water flow. Said pipe K connects by the service pipes $l$ with the interior of the boxes D, there being valve $l'$ in said pipes $l$ to control the water flow. The water passes just below the tops of the boxes D into the water-chambers M, the bottom whereof, $m$, is arranged with holes, permitting the water to issue therefrom in a spray upon the gas passing below said chamber M in D, thereby scrubbing the gas and washing therefrom by absorption the impurities hereinbefore described. In order that, however, this process of washing may be still more perfectly accomplished, the gas is made to pass between a series of $\wedge$-shaped obstruction pieces, O. Now as, by the continuous shower of water upon said $\wedge$ pieces O, they are kept moistened, the gas current striking thereon, a further thorough absorption of ammoniacal and other impurities is effected by the moisture aforesaid. The washing fluid or water then drops to the floor of the box and is drawn off (impregnated with the impurities before mentioned) by a stop-cock (not shown.) In order that the $\wedge$ pieces may be taken out for cleansing the boxes D may be arranged to be lifted off. It is, moreover, convenient to arrange the valve $n$ in the top of one of the boxes to admit water into the chamber M, or to permit the escape of water in case the boxes have been filled with water preparatory to introducing gas therein. Again, the cleansing process may be facilitated by using stop boxes N at the ends of the box, so that the same being removed the interior of the boxes may be inspected and cleansed. It is the special nature of my said invention, and the arrangement now hereinbefore described is conducive hereto specially constructed, to use the water from the water spaces E as washing fluid, thereby economizing the same; moreover, to pass said fluid through the spaces E, $D^2$, &c., in a direction reverse to the motion of the gas in the boxes D, hence the water supply is made at the end diagonally opposite to the point of entrance of the gas. Hereby is secured a slow circulation of the water from the point of its entrance to the spaces E, to the point of entrance of the gas, where the highest temperature is found, and thus a gradual condensation of the aqueous and other condensable gas impurities takes place.

Having thus fully described my invention, what I claim is—

1. The lengthy and narrow boxes D, the water-vessels $D^2$ above the same, and the water spaces E between the same, substantially as and for the purposes set forth.

2. The method of applying the water to condense, scrub, and wash the gas, substantially as set forth.

3. The combination of the vessels $D^2$, the overflow pipes $k$, water pipe K, service pipes $l$, and water-chambers M, as and for the purposes set forth.

4. The application of the jet-chamber M, as and for the purpose set forth.

5. The application of obstruction pieces extending from top to bottom of the boxes D, substantially as and for the purposes set forth.

6. The arrangement and combination of the pipes F and G, $f$ and $g$, with their stop-cocks, valves, and the boxes $d$ $d^1$ $d^3$ and $d^7$, as and for the purposes set forth.

THOMAS B. BURTIS.

Witnesses:
   GEO. ARTHUR,
   S. D. CARPENTER.